United States Patent
Bobrinskoy et al.

(10) Patent No.: US 10,261,505 B2
(45) Date of Patent: Apr. 16, 2019

(54) CRITICAL SYSTEM AND ASSOCIATED MONITORING METHOD

(71) Applicant: Thales, Neuilly sur Seine (FR)

(72) Inventors: Alexandre Bobrinskoy, Pessac (FR); Olivier Guerineau, Pessac (FR); Franck Cazaurang, Leognan (FR); Marc Gatti, Pessac (FR); Bruno Bluteau, Arthez de Bearn (FR)

(73) Assignee: THALES, Neuilly sur Seine (FR)

(*) Notice: Subject to any disclaimer, the term of this patent is extended or adjusted under 35 U.S.C. 154(b) by 64 days.

(21) Appl. No.: 15/036,168

(22) PCT Filed: Nov. 19, 2014

(86) PCT No.: PCT/EP2014/074978
§ 371 (c)(1),
(2) Date: May 12, 2016

(87) PCT Pub. No.: WO2015/075052
PCT Pub. Date: May 28, 2015

(65) Prior Publication Data
US 2016/0291586 A1 Oct. 6, 2016

(30) Foreign Application Priority Data
Nov. 19, 2013 (FR) ...................... 13 02661

(51) Int. Cl.
*G05B 9/03* (2006.01)
*G05B 23/02* (2006.01)

(52) U.S. Cl.
CPC .......... *G05B 23/0254* (2013.01); *G05B 9/03* (2013.01)

(58) Field of Classification Search
CPC ................................................ G05B 23/0254
See application file for complete search history.

(56) References Cited

U.S. PATENT DOCUMENTS

2005/0143872 A1* 6/2005 Barazzetti ............... G01S 19/55
701/4
2006/0250154 A1* 11/2006 Gao ..................... G01R 31/343
324/765.01

(Continued)

FOREIGN PATENT DOCUMENTS

EP    2381322 A2    10/2011

OTHER PUBLICATIONS

Bobrinskoy Alexandre et al: "Dynamic inversion of a flight critical actuator for fault diagnosis", 2013 IEEE/AIAA 32nd Digital Avionics Systems Conference (DASC), IEEE, Oct. 5, 2013 (Oct. 5, 2013).

(Continued)

*Primary Examiner* — Imran K Mustafa
(74) *Attorney, Agent, or Firm* — Troutman Sanders LLP (57) ABSTRACT

A critical system comprises a control pathway comprising an actuation unit having a nonlinear behavior, that is able to be controlled by applying an input quantity and whose state is characterized by an output quantity. The behavior of the actuation unit being described by a flat nonlinear model, wherein the system comprises an estimation unit comprising a dynamic inversion linearization module calculating from the measured output quantity, the input quantity of the equivalent linear model; an estimation module estimating a flat output quantity from the input quantity of the equivalent linear model; and a computing module computing a residual based on the estimated flat output quantity and a measured flat output quantity, corresponding to the measured output quantity.

9 Claims, 12 Drawing Sheets

(56) References Cited

U.S. PATENT DOCUMENTS

2011/0066305 A1 3/2011 Lin et al.
2011/0202226 A1* 8/2011 Welchko ............... B60L 3/0038
          701/31.4
2013/0158680 A1* 6/2013 Fuller .................. G05B 13/048
          700/29

OTHER PUBLICATIONS

Bobrinskoy et al: "Model-based fault detection and isolation design for flight-critical actuators in a harsh environment", 2012 IEEE/AIAA 31st Digital Avionics Systems Conference (DASC), Oct. 1, 2012 (Oct. 1, 2012). pp. 1-17.
V.M. Lamine Fadiga: "Modeles et Algorithmes de Detection de Defauts pour Actionneurs Electrohydraustatiques", Jan. 1, 2010 (Jan. 1, 2010), pp. 1-64, Retrieved from the Internet: URL:https://extranet.ims-bordeaux.fr/External/IMS/ressources/fichiersPagesPerso/franck.cazaurang@laps.ims-bordeaux.fr/RapportMaster FADIGA Lamine.pdf, [retrieved on Aug. 20, 2014].
French Search Report dated Aug. 20, 2014 issued in corresponding French Patent Application No. FR1302661.
International Search Report and Written Opinion dated Jan. 8, 2015 issued in corresponding PCT International Patent Application No. PCT/EP2014/074978.

* cited by examiner

CRITICAL SYSTEM AND ASSOCIATED MONITORING METHOD

CROSS-REFERENCE TO RELATED APPLICATIONS

This application is the U.S. National Phase of International Patent Application Serial No. PCT/EP2014/074978, filed Nov. 19, 2014, which claims priority to French Patent Application No. 1302661, filed Nov. 19, 2013, both of which are herein incorporated by reference in their entireties.

FIELD OF THE INVENTION

The present invention relates to a critical system, in particular a critical flight system, of the type including a control pathway including an actuation unit having a non-linear behavior, that is able to be controlled by applying an input quantity and whose state is characterized by an output quantity measured by appropriate sensors.

BACKGROUND

The invention generally relates to the field of the operating safety of a critical system onboard a vehicle.

The vehicle can be an aircraft (such as an airplane), a guided vehicle (such as a train), a motor vehicle (such as a passenger car), a vessel (such as a submarine), etc.

The critical system can be a propulsion means (such as a synchronous electric motor), a monitoring means (such as an electric monitoring sensor), a control means (such as an electric flight control actuator of an airplane or air/fuel metering actuator of a helicopter turbine), a regulating means (such as a feedback chain), etc.

The case of an electromechanical actuation unit including a stepping induction motor will more particularly be studied.

A failure will refer to a deviation between the service delivered by a system and the expected service. A failure is caused by an error, such as an alteration in the state of the system. This error is caused by a fault.

A fault affecting a system may have more or less serious consequences for the operation of the vehicle. This is referred to as the criticality of the system.

Different standards are enforced to classify systems based on their criticality. For example, in the avionics field, standard ARP 4754 makes it possible to classify the criticality of a system according to several DAL (Design Assurance Level) levels. This scale extends between a low criticality level E and a high criticality level A. At the latter level, the possible failure rate of the system per hour of use must be less than $10^{-9}$.

A critical system must thus meet a certain number of criteria making it possible to guarantee the safety of its operation.

In this context, various notions have been developed. In particular, the notion of reliability of the critical system indicates the number of failures of any type that may affect a system. The notion of safety of the critical system indicates the number of failures that have catastrophic consequences for the vehicle.

In order to improve the reliability of a critical system, various approaches can be used, in particular by integrating a monitoring pathway in the primary control pathway incorporating the actuation unit.

Figure 1:
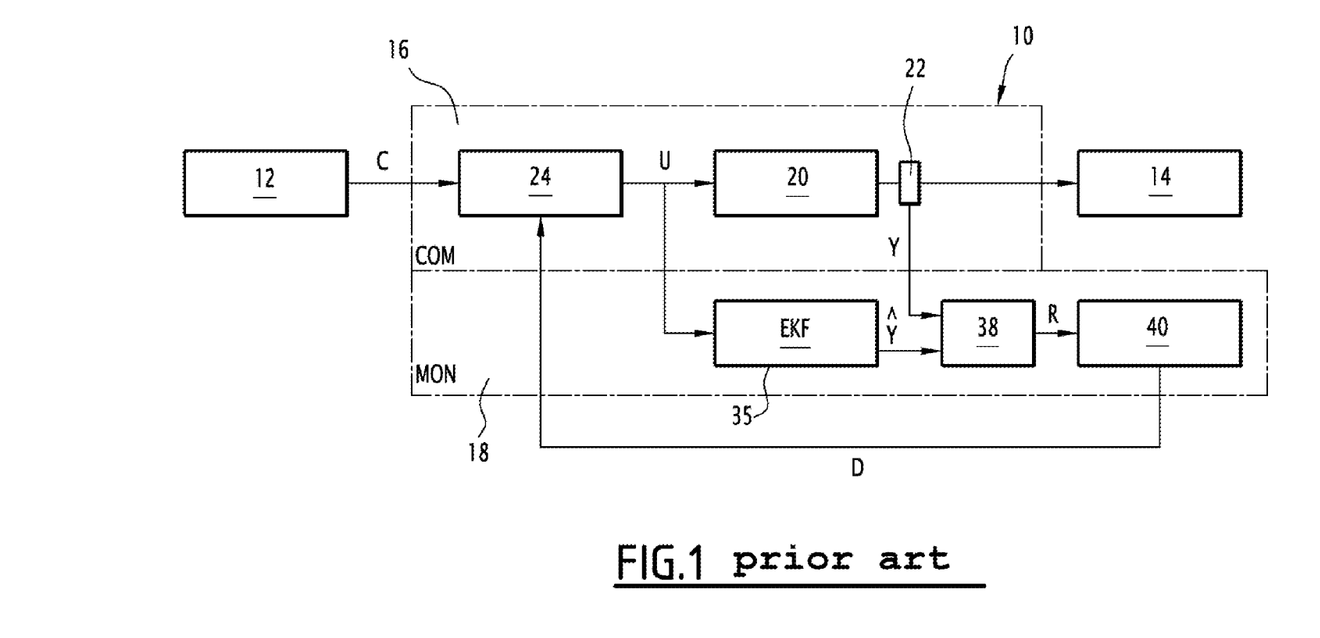
FIG. 1 is a block diagram illustrating a critical system of the prior art.

FIG. 1 shows one such critical system. The system 10 is inserted between a computer 12 and mechanical system 14, actuated by the system 10. The system 10 includes a control pathway COM 16 and a monitoring pathway MON 18.

The control pathway COM 16 includes, as actuation unit, a stepping hybrid motor 20. The motor 20 is controlled by a control module 24 able to generate a command from a setpoint generated by the computer 12. At the outlet of the motor 20, several output variables are measured by appropriate sensors 22. The monitoring channel MON 18 is adapted to the monitoring of the motor 20.

The monitoring channel MON 18 includes a module 35 capable of determining an estimate of the output variables from the command applied to the motor. The monitoring channel includes a computing module 38 for computing residuals from the measured variables and estimated variables. The monitoring pathway includes a diagnostic module 40 capable of comparing each residual to a predetermined threshold and emitting an inhibiting signal to the control module 24 once the value of a residue has exceeded the corresponding threshold.

This solution of the state of the art has the following drawbacks.

The actuation unit of the control pathway includes elements that are not linear, such as the motor and the sensors, optionally the control module. The module for estimating the monitoring pathway is based on a model of the monitored actuation unit that is either a linear model or a nonlinear model.

A linear model is too imprecise to be able to be validly used to monitor a critical onboard system.

A nonlinear model is more representative of the behavior of the monitored actuation unit, but is complex both theoretically and in terms of implementation. An estimating module based on a nonlinear model uses a larger number of output quantities and requires significant computing capacities to carry out the monitoring method.

In both cases, linear and nonlinear, it is necessary to use high thresholds on the residuals to be robust with respect to disruptions of the actuation unit and the uncertainties of the model used, i.e., to limit the number of false alarms, undetected faults, etc.

SUMMARY

The present invention aims to offset the aforementioned problems, in particular to guarantee an acceptable reliability and availability level of a critical system.

To that end, the invention relates to a critical system, in particular a critical flight system, of the type including a control pathway including an actuation unit having a non-linear behavior, which is able to be controlled by applying an input quantity and the state of which is characterized by an output quantity measured by appropriate sensors, characterized in that, the behavior of the actuation unit being described by a flat nonlinear model, for which there is an equivalent linear model making it possible to go from an input quantity to a flat output quantity, the system includes a monitoring pathway for the control pathway, having an estimation unit that includes:

- a module for linearization by dynamic inversion able, from the measured output quantity, to calculate the input quantity of the equivalent linear model;
- a module for estimating a flat output quantity from the input quantity of the equivalent linear model, based on said equivalent linear model; and a module for computing a residual based on the estimated flat output quantity and a measured flat output quantity, corresponding to the measured output quantity.

According to specific embodiments, the system includes one or more of the following features, considered alone or according to any technically possible combinations:
- the estimating module implements a SKF (Standard Kalman Filter) observer;
- the actuation unit includes an induction motor;
- the induction motor is of the hybrid stepping type;
- the input quantity of the equivalent linear model is:

$$v = \begin{pmatrix} \dot{i}_d \\ \dddot{\vartheta}_m \end{pmatrix}$$

where
$\dot{i}_d$ is the first time derivative of the current in the motor expressed in the reference dq; and
$\dddot{\vartheta}_m$ is the third time derivative of the angular position of the rotor, and the measured flat output quantity is:

$$z = \begin{pmatrix} i_d \\ \vartheta_m \end{pmatrix};$$

- the mechanical and electromagnetic equations of the behavior of the motor make it possible to define the equivalent linear model according to:

$$\begin{pmatrix} z_1 \\ z_2 \end{pmatrix} = \begin{bmatrix} s & 0 \\ 0 & s^3 \end{bmatrix} \begin{pmatrix} v_1 \\ v_2 \end{pmatrix}$$

where s represents the time integration.
- the actuation unit further includes a control module able, from a setpoint quantity, to generate the input quantity of the actuation unit;
- a monitoring pathway further has a diagnostic module using at least one residual as input and capable of generating an inhibition signal of the control pathway;
- the system includes a first control pathway associated with a first monitoring pathway, the latter generating first residuals, a second control pathway associated with a second monitoring pathway, capable of making the first control and monitoring pathways redundant, the second monitoring pathway generating second residuals, the system further including a shared diagnostic module, able to inhibit one and/or the other of the first and second control pathways, once a fault is detected, based on the first and second residuals.

The invention also relates to a method for monitoring a critical system, in particular a critical flight system, of the type including a control pathway including an actuation unit having a nonlinear behavior, which is able to be controlled by applying an input quantity and the state of which is characterized by an output quantity measured by appropriate sensors, characterized in that, the behavior of the actuation unit of the system being described by a flat nonlinear model for which there is an equivalent linear model making it possible to go from an input quantity to a flat output quantity, the method includes a step for linearization by dynamic inversion able, from the measured output quantity, to calculate an input quantity of the equivalent linear model, and a step for estimating a flat output quantity of the equivalent linear system, from the calculated input quantity, and by using said equivalent linear model.

According to one embodiment, the method includes a step for calculating at least one residual by difference between the estimated flat output quantity and a measured flat output quantity, obtained from the measured output quantity, and a diagnostic step based on the comparison of the or each residual to a threshold value.

BRIEF DESCRIPTION OF THE DRAWINGS

The invention and its advantages will be better understood upon reading the following description, provided solely as a non-limiting illustration of one example embodiment, done in reference to the appended drawings, in which.

DETAILED DESCRIPTION

One particular class of systems, called "flat systems", allows a high bijective equivalence, called "dynamic inversion", between a nonlinear model describing the behavior of a system and an equivalent linear model. In the estimation module, by performing a linearization by dynamic inversion, then using the equivalent linear model, it is possible to monitor the system, by reusing the tools traditionally used for the diagnosis of linear systems.

Below, a fault detection method based on observers is applied to a control unit that is made up of a hybrid stepping motor, or HSM.

In general, a nonlinear system of order n corresponds to the following dynamic equation:

$$\dot{x} = f(x, u), \; x \in \mathbb{R}^n, \; u \in \mathbb{R}^m \tag{1}$$

where:
x is a vector of dimension n representing the instantaneous state of the system,
u is a vector of dimension m, the components $u_i$ of which represent the inputs of the nonlinear system,
f is a sufficiently derivable function A nonlinear system is flat, when there is a set of m variables, forming the components $z_i$ of a flat output vector z, which depend on the state vector x and the input vector u and their time derivatives, according to the relationship:

$$z = \psi_z(x, u, \dot{u}, \ldots, u^{(p)}) \tag{2},$$

such that the state vector and the input vector can express themselves only from the flat output vector z and its derivatives, according to the relationships:

$$x = \psi_x(z, \dot{z}, \ldots, z^{(q)}) \tag{3}$$

$$u = \psi_u(z, \dot{z}, \ldots, z^{(q+1)}) \tag{4},$$

where:
$g^{(p)}$ represents the $p^{th}$ derivative of the function g relative to the time t.

It is shown that any flat nonlinear system has a corresponding equivalent linear system, the input vector of which is denoted v and the output vector of which is the flat output vector z.

The conversion making it possible to go from a nonlinear system to the equivalent linear system is a linearization operation. One possible linearization procedure is the use of an endogenous feedback linearization, known in mathematics.

According to this procedure, the components $v_i$ of the input vector v of the equivalent linear system are given by:

$$\begin{cases} v_1 = z_1^{(k_1)} \\ \vdots \\ v_m = z_m^{(k_m)} \end{cases} \quad (5)$$

where $k_i$ is the maximum derivation degree of the component $z_i$ of the flat output vector z, participating in relationship (4).

For the specific case of a HSM, the nonlinear model of its dynamics is obtained from electrical equations governing the behavior of the motor in the referential ab of the stator:

$$u_a = r \cdot i_a + L \cdot \frac{di_a}{dt} + K_E \cdot \omega \cdot \sin(n \cdot \vartheta_m) \quad (6)$$

$$u_b = r \cdot i_b + L \cdot \frac{di_b}{dt} - K_E \cdot \omega \cdot \cos(n \cdot \vartheta_m), \quad (7)$$

where:
($u_a$, $u_b$) and ($i_a$, $i_b$) are respectively the voltages and currents applied and circulating in the phases a and b of the stator of the motor, according to a common name known by those skilled in the art.
r and L are the resistance and inductance, respectively, of the phases of the stator,
$K_E$ is the constant of the electromotive force,
n is the number of poles of the rotor of the motor,
$\vartheta_m$ is the angular position of the rotor, and
$\omega$ is the angular speed of the rotor,
as well as the mechanical equations:

$$J \cdot \frac{d\omega}{dt} = T_{em} - T_{det} - B\omega \quad (8)$$

$$\frac{d\vartheta_m}{dt} = \omega, \quad (9)$$

where:
J is the moment of inertia of the rotor of the motor,
B is a viscous friction coefficient,
$T_{em}$ is the electromechanical torque,
$T_{det}$ is the detent torque.
$T_{em}$ is given by the following equation: $T_{em} = -K_t(i_a \sin(n\vartheta_m) - i_b \cos(n\vartheta_m))$
where:
$K_t$ is the torque constant associated with the motor.
In the following, the detent torque $T_{det}$ is omitted, since its amplitude is less than 10% of the electromechanical torque $T_{em}$.

In a known manner, the nonlinear model expressed in the reference ab is expressed in the reference da of the rotor by using the following matrix transform:

$$P(\vartheta_m) = \begin{bmatrix} \cos(n\vartheta_m) & \sin(n\vartheta_m) \\ -\sin(n\vartheta_m) & \cos(n\vartheta_m) \end{bmatrix} \quad (10)$$

Consequently, the nonlinear model in the reference dq of the motor is given by:

$$u_d = r \cdot i_d + L \cdot \frac{di_d}{dt} - L \cdot n \cdot \omega \cdot i_q \quad (11)$$

$$u_q = r \cdot i_q + L \cdot \frac{di_q}{dt} + L \cdot n \cdot \omega \cdot i_d + K_t \cdot \omega \quad (12)$$

$$J \cdot \frac{d\omega}{dt} = K_t \cdot i_q - B\omega \quad (13)$$

$$\frac{d\vartheta_m}{dt} = \omega, \quad (14)$$

Next, one verifies that this nonlinear model is in fact that of a flat nonlinear system. To that end, one defines the following vectors:
the input vector u has two components (m=2), which respectively correspond to the voltages: $u_1 = u_d$ and $u_2 = u_q$,
the state vector x of the nonlinear model has four components (n=4), which respectively correspond to the currents, the angular speed and the angular position: $x_1 = i_d$, $x_2 = i_q$, $x_3 = \omega$, and $x_4 = \vartheta_m$.
the flat output vector z has two components (m=2), which respectively correspond to the direct current and the angular position: $z_1 = i_d$ and $Z_2 = \vartheta_m$.
Or, in vectorial form:

$$u = \begin{pmatrix} u_d \\ u_q \end{pmatrix} \quad (15)$$

$$x = \begin{pmatrix} i_d \\ i_q \\ \omega \\ \vartheta_m \end{pmatrix} \quad (16)$$

$$z = \begin{pmatrix} i_d \\ \vartheta_m \end{pmatrix}, \quad (18)$$

The preceding equations then lead to:

$$x_1 = z_1 \quad (19)$$

$$x_2 = \frac{J}{K_t} \cdot \ddot{z}_2 + B \cdot \dot{z}_2 \quad (20)$$

$$x_3 = \dot{z}_2 \quad (21)$$

$$x_4 = z_2, \quad (22)$$

and:

$$u_1 = R \cdot z_1 + L\dot{z}_1 - Ln \cdot \dot{z}_2 \left( \frac{J}{K_t} \cdot \ddot{z}_2 + B \cdot \dot{z}_2 \right) \quad (23)$$

$$u_2 = R \cdot \left( \frac{J}{K_t} \cdot \ddot{z}_2 + B \cdot \dot{z}_2 \right) + L \cdot \left( \frac{J}{K_t} \cdot \dddot{z}_2 + B \cdot \ddot{z}_2 \right) + \dot{z}_2(K_t + nLz_1) \quad (24)$$

Thus, u and x are expressed as a function of z and its derivatives, as required by relationships (3) and (4). The nonlinear model is therefore flat. It can consequently be linearized by dynamic feedback.

Since, in the equations above, the maximum time deviation order of the first flat output $z_1$ is 1, and since the maximum time deviation order of the second flat output $z_2$ is 3, the input vector v of the equivalent linear system is:

$$v_1 = \dot{z}_1 \quad (25)$$

$$v_2 = \dddot{z}_2 \quad (26)$$

Or:

$$v = \begin{pmatrix} \dot{i}_d \\ \dddot{\vartheta}_m \end{pmatrix} \quad (27)$$

The equivalent linear model is then given by:

$$\begin{pmatrix} z_1 \\ z_2 \end{pmatrix} = \begin{bmatrix} s & 0 \\ 0 & s^3 \end{bmatrix} \begin{pmatrix} v_1 \\ v_2 \end{pmatrix}, \quad (28)$$

in which expression the time integration is represented by the multiplication by s, as is known by one skilled in the art.

Based on these mathematical results, the structure of a critical system will now be described.

Figure 2:
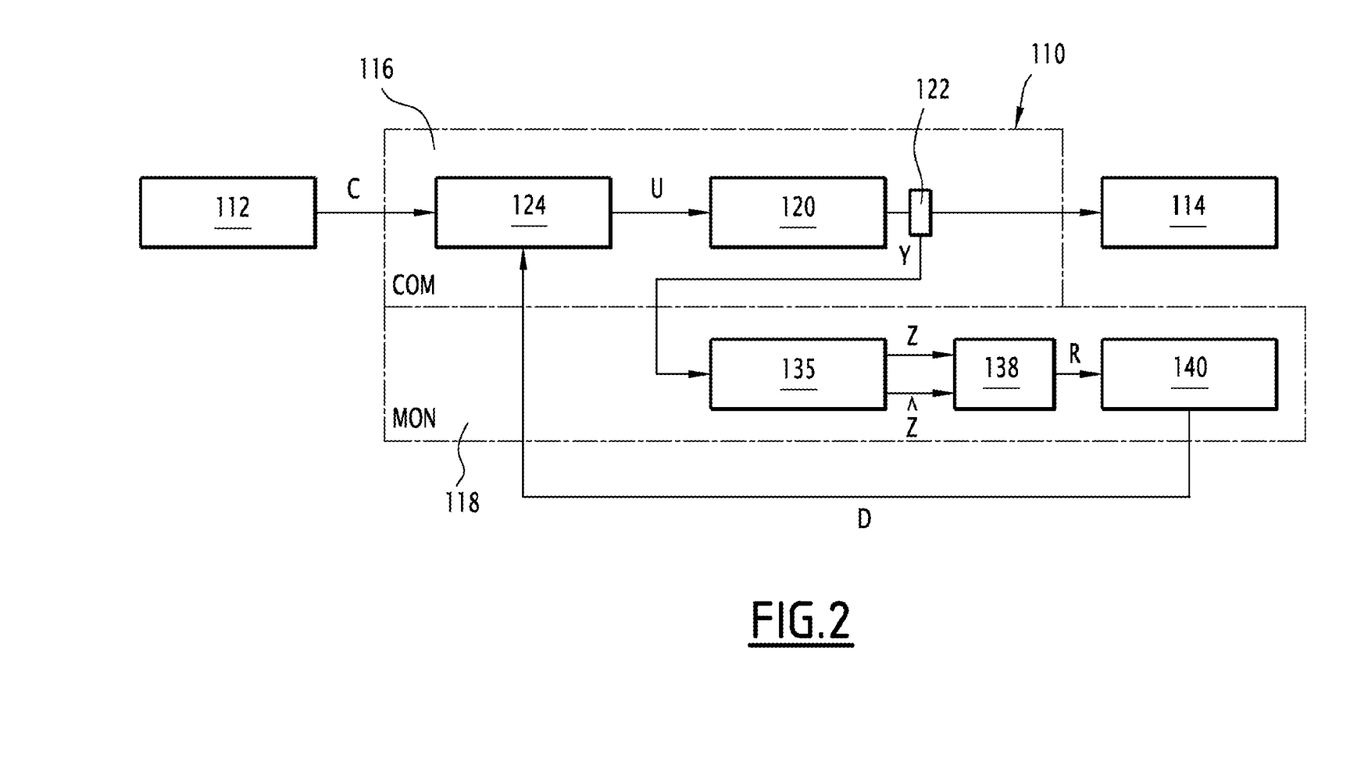
FIG. 2 is a block diagram of a critical system according to the invention.

The critical control system of FIG. 2, generally identified by reference 110, is inserted between a computer 112 and a mechanical system 114, actuated by the system 110.

The system 110 includes a control pathway COM 116 and a monitoring pathway MON 118.

The control pathway COM 116 includes a motor HSM 120 as monitored actuation unit.

The motor 120 is commanded by the application of a vectorial input quantity corresponding to the vector u of the voltages $u_a$ and $u_b$.

At the output of the motor 120, a vectorial output quantity is measured using a plurality of appropriate sensors 122. The measured output quantity y corresponds to the current $i_a$ and $i_b$ and to the angular position $\vartheta_m$.

The control pathway COM 116 includes a control module 124 able to generate an input vector u of the motor 120 from a setpoint signal C. The setpoint signal C is generated by the computer 112.

The monitoring pathway MON 118 is adapted to monitoring of the motor 120.

Figure 3:
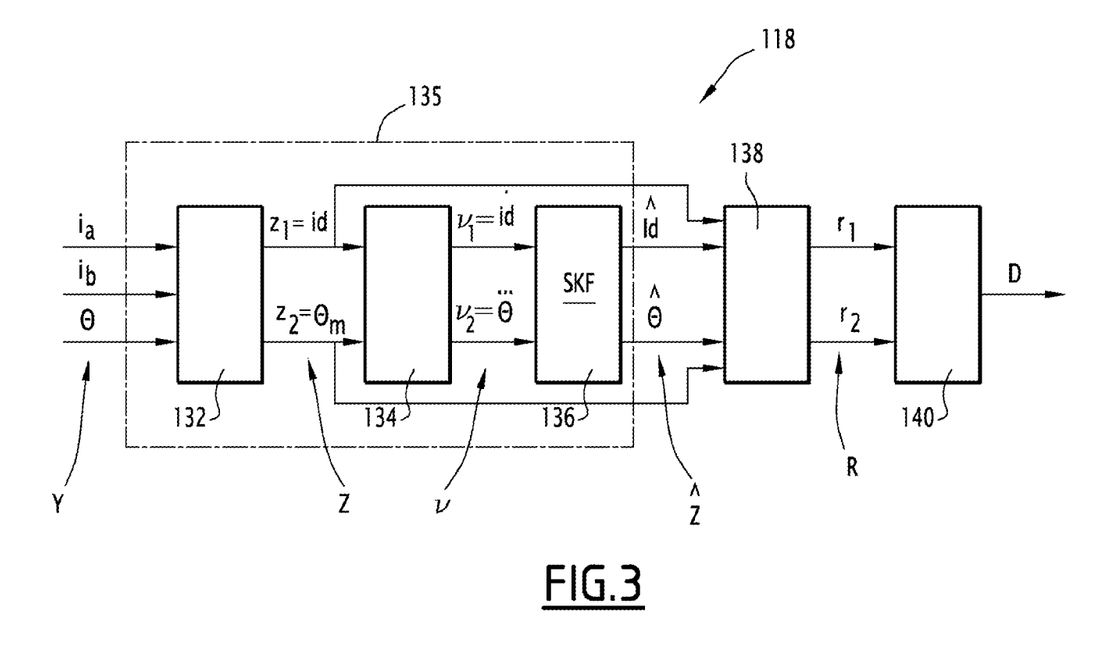
FIG. 3 is a block diagram illustrating a monitoring pathway of the critical system of FIG. 2.
Figure 4:
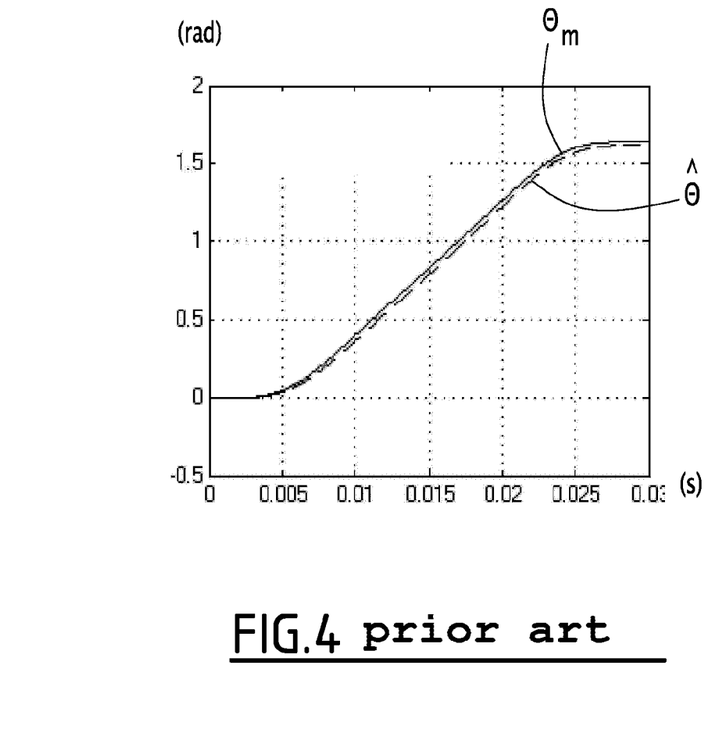
FIGS. 4 to 19 show graphs making it possible to compare the invention to the state of the art.
Figure 5:
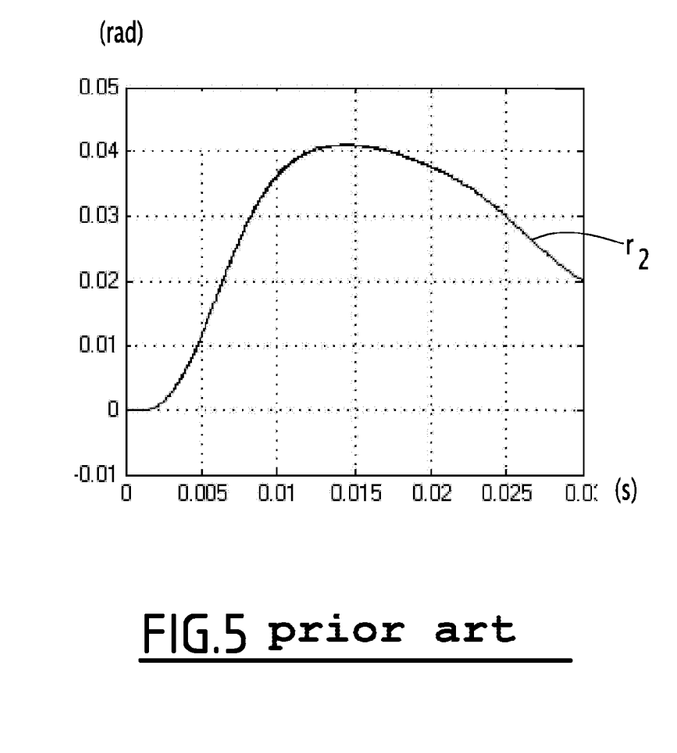
Figure 6:
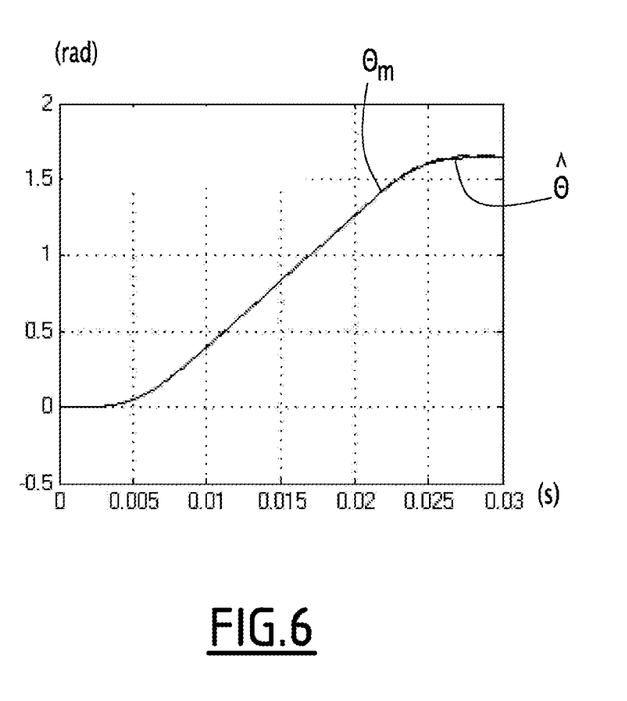

As shown in more detail in FIG. 3, the monitoring pathway MON 118 includes a passage module 132 in the plane of reference $\overline{dq}$, a dynamic feedback module 134, an estimation module 136, a module 138 for calculating residuals and a diagnostic module 140.

The module 132 uses the measured output vector y as input. It is capable of applying the matrix P on the current $i_a$ and $i_b$ to obtain the current $i_d$ and $i_q$. At the output of the module 132, a measured flat output vector z is obtained, the components of which are the flat output $z_1$, corresponding to the current $i_d$, and the flat output $z_2$, corresponding to the angular position $\vartheta_m$. The module 134 makes it possible to determine the input vector v of the equivalent linear model. From a flat output vector z, the module 134 calculates the first input of the equivalent linear model $v_1$, like the first order time derivative of the current $i_d$, and the second input of the equivalent linear model $v_2$, like the order three time derivative of the angular position $\vartheta_m$.

The estimation module 136 is capable of estimating an estimated flat output vector $\hat{z}$, based on the equivalent linear model. The module 136 uses, as input, the input vector v of the equivalent linear system generated at the output of the module 134.

In one preferred embodiment, the module 136 implements a discrete SKF (Standard Kalman Filter) algorithm in order to estimate the estimated flat output vector $\hat{z}$. Such an algorithm is known by those skilled in the art.

The estimation module 136 is capable of estimating an estimated flat output vector $\hat{z}$, based on the equivalent linear model. The module 136 uses, as input, the input vector v of the equivalent linear system generated at the output of the module 134.

In one preferred embodiment, the module 136 implements a discrete SKF (Standard Kalman Filter) algorithm in order to estimate the estimated flat output vector $\hat{z}$. Such an algorithm is known by those skilled in the art.

The module 138 is capable of calculating residuals for each component of the flat output vector. The module 138 is able to subtract the measured value of the current $i_d$, obtained at the output of the module 132, from the estimated value of the current $\hat{i}_d$, obtained at the output of the module 136, so as to obtain a first residual $r_1$.

The module 138 is able to subtract the measured value of the angle $\vartheta_m$, obtained at the output of the module 132, from the estimated value of the angle $\hat{\vartheta}_m$, obtained at the output of the module 136, so as to obtain a second residual $r_2$.

The residual vector R thus calculated is sent to the diagnostic module 140.

The module 140 monitors failures of the short-circuit type at the winding of the stator of the motor 120, by implementing fault detection and location algorithms initially adapted to linear systems. The module 140 is thus according to the diagnostic modules of the state of the art associated with linear systems.

For example, the module 140 is capable of comparing its residual $r_i$ to a predetermined threshold $r_{i0}$ and emitting an inhibition signal D once at least one of the residuals is above the corresponding threshold.

The inhibition signal D is applied to the control module 124 of the motor 120. The latter is able to interrupt the operation of the motor 120 upon receiving the inhibition signal D.

If a fault is detected, the decision emitted by the diagnostic module makes it possible to act before a failure spreads in the rest of the chain and deteriorates other components.

FIGS. 4 to 19 show simulations of the behavior of the system of FIG. 2 compared to that of FIG. 1. For these simulations, the estimation module of the system of FIG. 1 implements a discrete EKF (Extended Kalman Filter) algorithm, based on a nonlinear model of the motor to be monitored. Such an algorithm is also known by those skilled in the art.

The simulations are obtained with the following values of the parameters of the nonlinear model of the motor: r=0.55Ω; L=1.5 mH; J=4.5×10$^{-5}$ kg.m2; B=8×10$^{31\ 4}$ Nm.s/rad; n=200; Kt=0.19 Nm/A.

FIGS. 4 to 11 correspond to faultless simulations of the motor.

The maximum amplitude of the residuals $r_1$ and $r_2$ (FIGS. 11 and 7) of the SKF estimation after dynamic feedback is lower than that of the corresponding residuals of the EKF estimation.

Furthermore, the estimation of the current (FIG. 10) or the angular position (FIG. 6) is obtained more quickly for the SKF estimation after dynamic feedback than for the EKF estimation.

Figure 8:
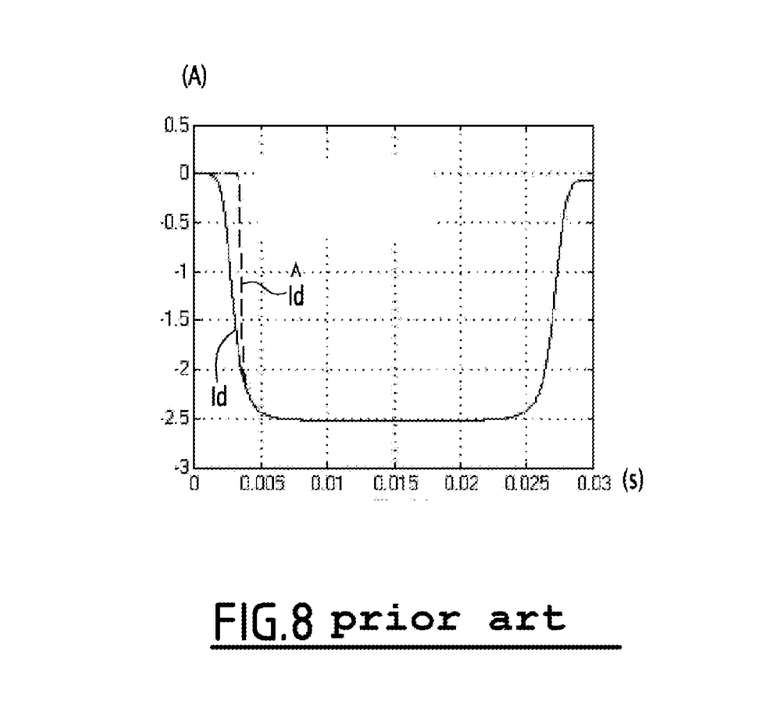
Figure 9:
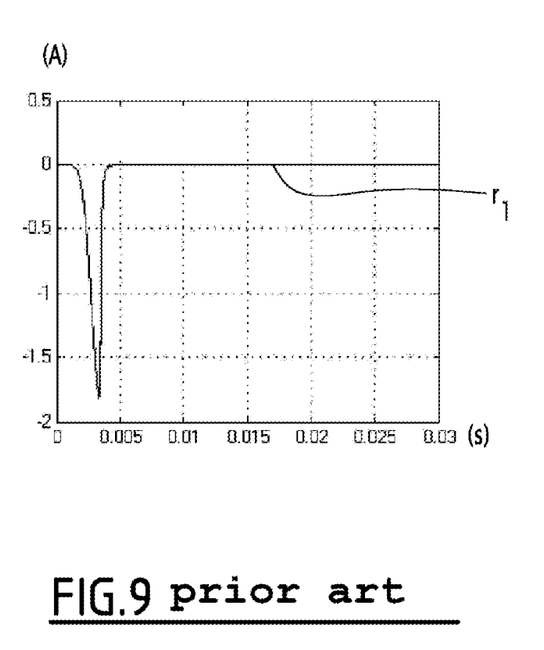
Figure 10:
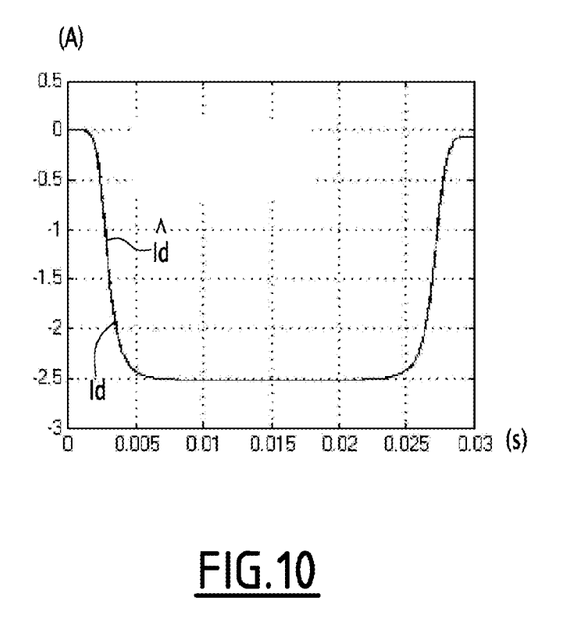

It should be noted that in FIG. 8, and in the corresponding FIG. 9, the deviation between the estimated current and the measured current is caused by the initialization of the EKF estimator.

Figure 7:
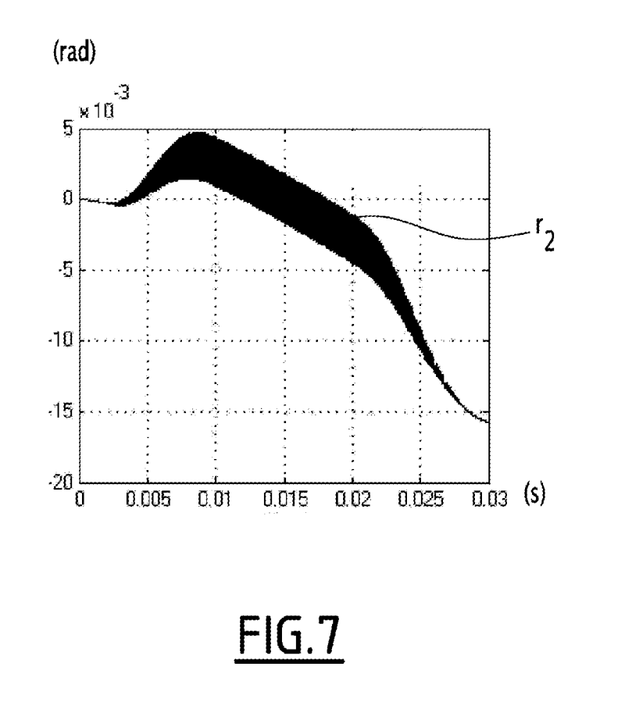
Figure 11:
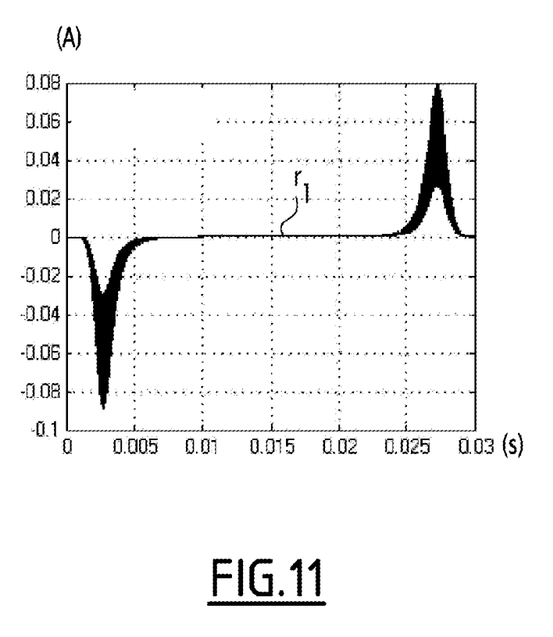

Furthermore, the black area of FIGS. 7 and 11 is due to a rapid oscillation of the residual.

FIGS. 12 to 19 correspond to a simulation with the occurrence of a fault. This fault corresponds to a short-circuit appearing 0.015 seconds after the beginning of the simulation.

Figure 12:
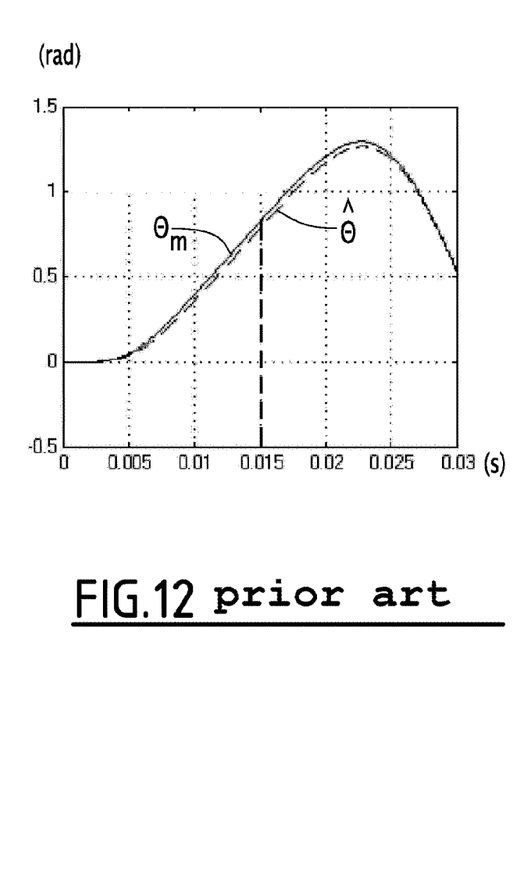
Figure 13:
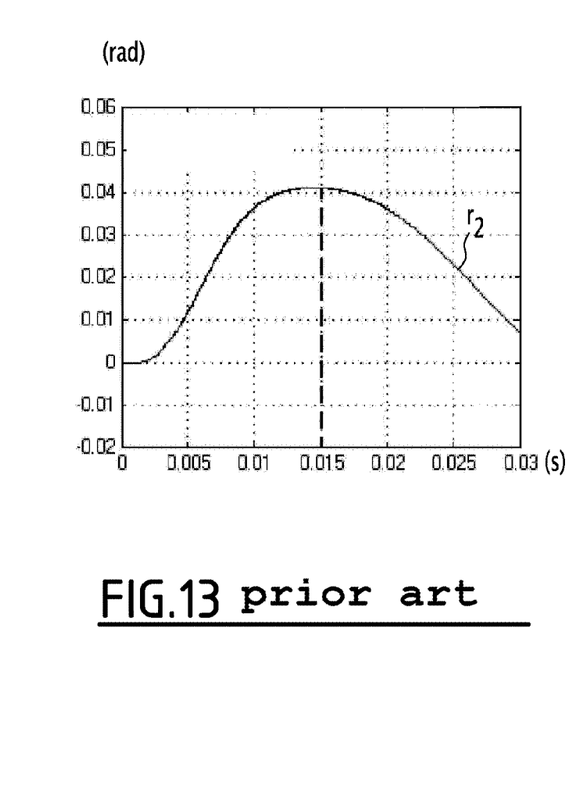

In FIG. 12, the estimation of the angular position follows the measurement of the angular position. Likewise, in FIG. 16, the estimation of the current follows the measurement of the current. The EKF estimation is therefore not sensitive to the occurrence of the fault. In particular, the amplitude of the residual $r_1$ (FIG. 17) a substantially null.

Figure 14:
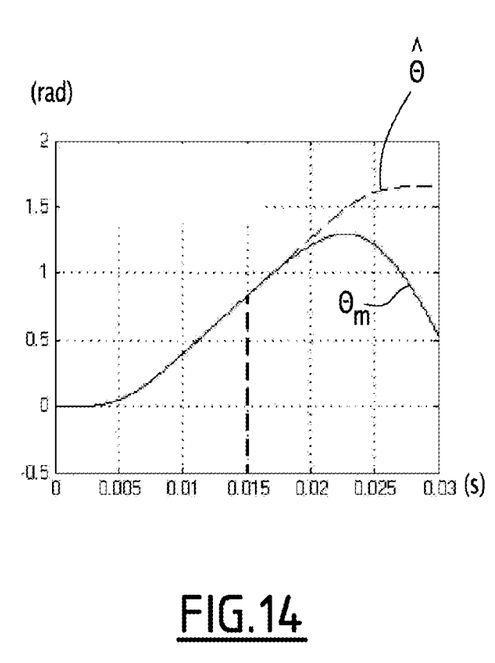
Figure 15:
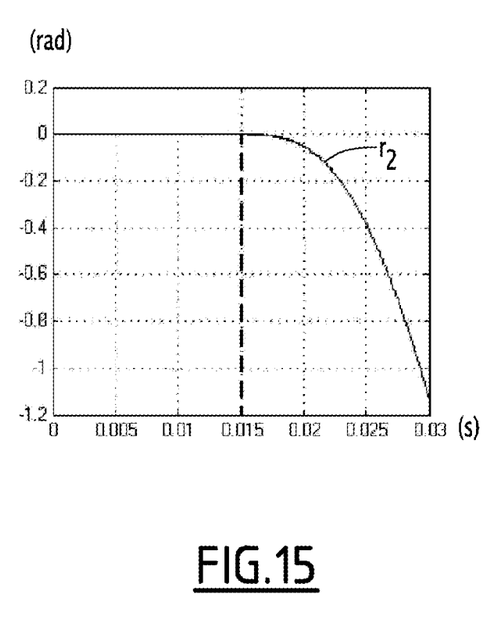
Figure 16:
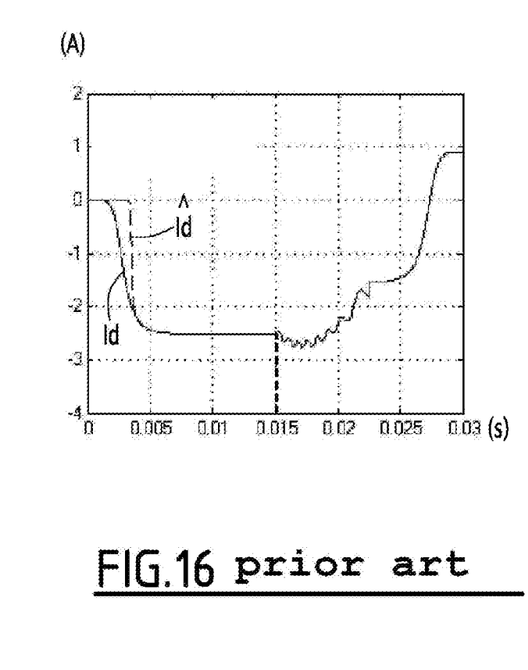
Figure 17:
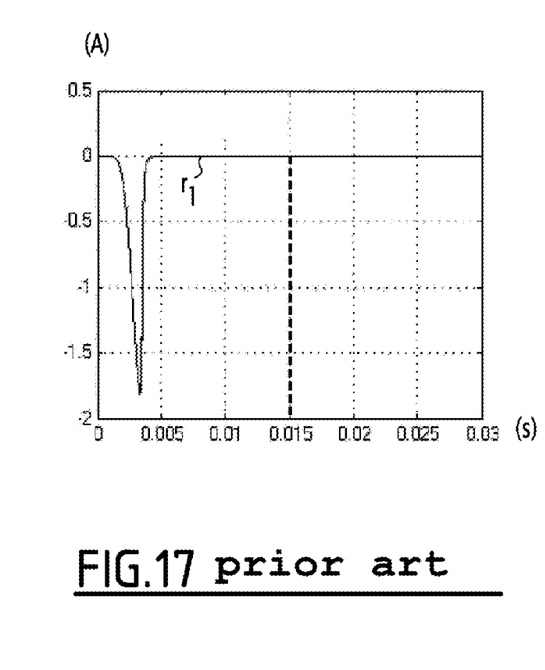
Figure 18:
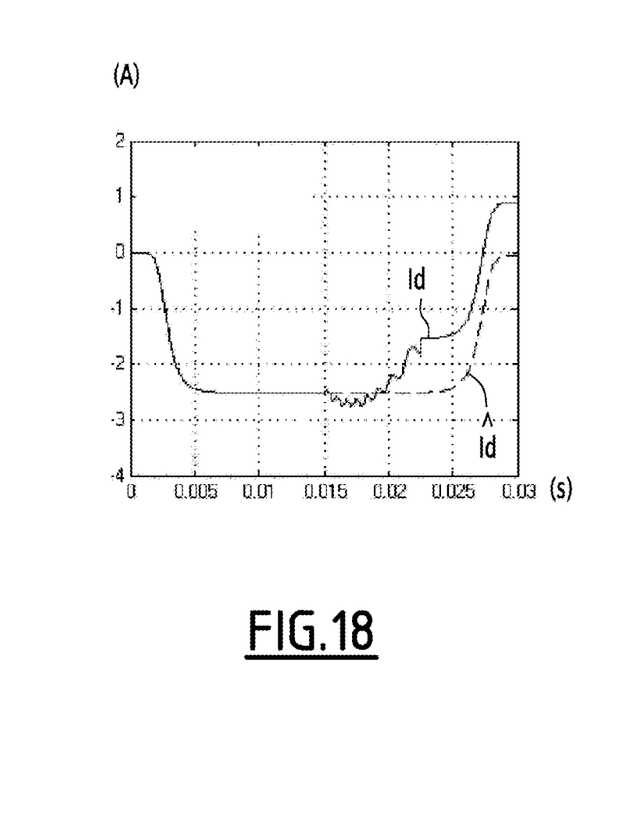
Figure 19:
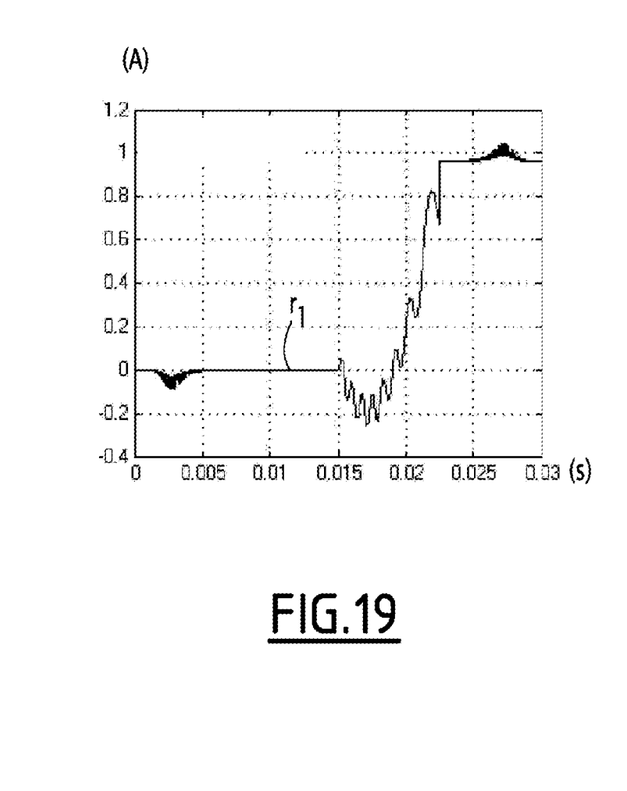

Conversely, in FIGS. 14 and 18, a clear difference can be seen between the estimated quantities and the measured quantities after the occurrence of the fault. This results in a significant evolution of the amplitude of the residuals $r_2$ (FIG. 15) and $r_1$ (FIG. 19) beyond 0.015 s.

It is then possible to define thresholds $r_{10}$ and $r_{20}$ for detecting a failure.

Advantageously, the dynamic feedback allows the choice of low thresholds while keeping good robustness with respect to false alarms.

Advantageously, a critical system, such as an electromechanical actuator, is made redundant in order to guarantee an availability and integrity level for the function it performs (steering a control surface or valve, for example).

Figure 20:
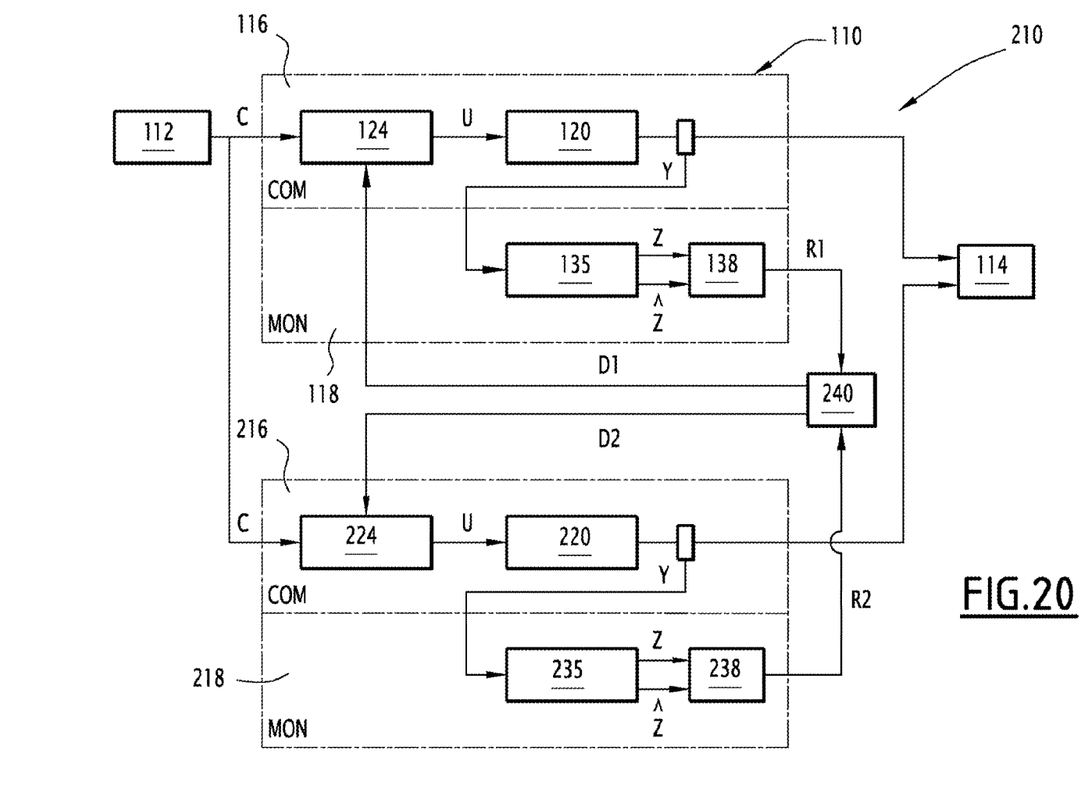
FIG. 20 is a block diagram illustrating a redundant critical system according to the invention.

Thus, FIG. 20 shows a redundant critical system 210 that has first control and monitoring pathways and second control and monitoring pathways.

The first control and monitoring pathways are identical to those of the system of FIG. 2. The component elements of these first pathways bear the same reference numbers as those used in FIG. 2.

The second control and monitoring pathways are similar to the first pathways. The component elements of these second pathways bear the reference numbers of the corresponding elements of the first pathways, increased by one hundred.

For redundancy, the first and second control and monitoring pathways are not identical so as to guarantee the availability of the function. They are made using different technologies. For example, components are used that are made from different materials (stepping electric motor for the first pathway and brushless DC motor for the second), different software components (different programming language for the estimation modules of the monitoring pathways), etc.

The control modules 124 and 224 receive the same setpoint C.

Advantageously, the diagnostic module 240 is shared by the first and second monitoring pathways.

The first residuals generated at the output of the module 138 and the second residuals generated at the output of the module 238 are applied at the input of the diagnostic module 240.

The latter is able to generate a first inhibition signal D1 toward the control module 124 and a second inhibition signal D2 toward the control module 224.

If, from a same setpoint signal applied at the input of the first and second control pathways, the residual of one of the monitoring pathways exceeds a predetermined threshold, thus indicating the presence of a fault in the corresponding control pathway, the diagnostic module is able to emit a signal to inhibit this faulty pathway. The system of the other control channel sees to the proper working of the critical system. It should be noted that deactivating a control channel causes the deterioration of the availability, but maintains the integrity of the system.

The monitoring pathway is advantageously made in the form of a programmable logic circuit (FPGA) or a microprocessor programmed using an appropriate computer program.

The method according to the invention thus consists of transforming a complex nonlinear model into an equivalent linear model by basing oneself on the flatness property of the nonlinear model.

Such a transformation done at each moment leads to an increase in the fault detection performance levels.

The critical system is more robust and more available.

This makes it possible to reach a required DAL level for the critical system more easily. Indeed, the critical system as a whole must have the DAL A level. This performance can be achieved by making the system with control and monitoring pathways respecting DAL levels equal to or less than: DAL A for one and DAL B for the other (or even C, depending on the necessary availability requirement).

The present solution has multiple advantages.

The number of parameters to be taken into account at the monitoring pathway is reduced, while improving the fault detection capacity. Consequently, the calculation capacities to be provided for the monitoring chain are reduced. The calculation times are often reduced. The development times of the monitoring chain are also reduced, as are the related costs as a result.

The sensors and actuators are sensitive to outside disruptions. The method according to the invention is inherently less sensitive to such disruptions; in particular, by increasing the detection thresholds on the residuals, it is possible to do away with such disruptions. The false alarm rate is thus reduced.

Alternatively, the nonlinear model takes these disruptions into account. As a result, better precision is obtained. Indeed, knowing the action channels of the disruptions makes it possible to have diagnostic indicators with an increased sensitivity to faults and a lower sensitivity to disruptions. In this way, the diagnostic is robust with respect to disruptions affecting the monitored device.

The diagnostic module can advantageously implement known algorithms associated with the linear systems, due to the use of the equivalent linear model in the estimator of relevant output quantities. These algorithms are less complex. This helps make the system easier to develop.

The invention claimed is:

1. A critical system, in particular a critical flight system, including a control pathway comprising:
    an actuation unit having a nonlinear behavior in the order of n and following the dynamic equation:

$$\dot{x} = f(x,u),\ x \in \mathbb{R}^n,\ u \in \mathbb{R}^m$$

where x is a vector state of dimension n, the components $x_i$ thereof representing an instantaneous state of the actuation unit, u is an input vector of dimension m, the components $u_i$ thereof representing input quantities of the actuation unit, f is a sufficiently derivable function, and n and m are integers, and is controlled by applying the input quantities and whose instantaneous state is characterized by output quantities measured by at least one appropriate sensor,
        wherein the behavior of the actuation unit is described by a flat nonlinear model, for which there exists an equivalent linear model establishing a relation between a flat input vector v of dimension m and a flat output vector z of dimension m, the flat output vector z depending on the state vector x and the input vector u and their time derivatives, according to the relationship:

$$z = \psi_z(x, u, \dot{u}, \ldots, u^{(P)})$$

such that the state vector x and the input vector u can be expressed only from the flat output vector z and its derivatives, according to the relationships:

$$x = \psi_x(z, \dot{z}, \ldots, z^{(q)})$$

$$u = \psi_u(z, \dot{z}, \ldots, z^{(q+1)})$$

where $g^{(p)}$ represents the $p^{th}$ derivative of the function g relative to time,
  wherein the system comprises a monitoring pathway for the control pathway, having an estimation unit comprising:
    a passage module calculating, from the measured output quantities, the flat output vector of the equivalent linear model;
    a dynamic inversion linearization module, calculating from the flat output vector calculated, the flat input vector of the equivalent linear model;
    an estimation module estimating the flat output vector of the equivalent linear model from the flat input vector of the equivalent linear model, based on said equivalent linear model; and
    a computing module computing a residual based on the flat output vector estimated at the output of the estimation module and the flat output vector computed at the output of the passage module.

2. The system according to claim 1, wherein the estimating module implements a SKF observer.

3. The system according to claim 1, wherein the actuation unit comprises an induction motor.

4. The system according to claim 3, wherein the induction motor is of the hybrid stepping.

5. The system according to claim 4, wherein the flat input vector v of the equivalent linear model is:

$$v = \begin{pmatrix} v_1 \\ v_2 \end{pmatrix} = \begin{pmatrix} \dot{i}_d \\ \dddot{\vartheta}_m \end{pmatrix}$$

wherein $\dot{i}_d$ is the first time derivative of a current in the induction motor expressed in dq reference frame;
wherein $\dddot{\vartheta}_m$ is the third time derivative of an angular position of a rotor of the induction motor, and
wherein the measured flat output vector z of the equivalent linear model is:

$$z = \begin{pmatrix} z_1 \\ z_2 \end{pmatrix} = \begin{pmatrix} i_d \\ \vartheta_m \end{pmatrix}.$$

6. The system according to claim 5, wherein the mechanical and electromagnetic equations of the behavior of the induction motor defining the equivalent linear model according to:

$$\begin{pmatrix} z_1 \\ z_2 \end{pmatrix} = \begin{bmatrix} s & 0 \\ 0 & s^3 \end{bmatrix} \begin{pmatrix} v_1 \\ v_2 \end{pmatrix}$$

wherein s represents the time integration.

7. The system according to claim 1, wherein the actuation unit further comprising a control module generating, from a setpoint quantity, the input vector of the actuation unit.

8. The system according to claim 1, wherein the monitoring pathway further having a diagnostic module using at least the residual as input and generating an inhibition signal of the control pathway.

9. The system according to claim 1, comprising:
  a first control pathway associated with a first monitoring pathway, the latter generating first residuals;
  a second control pathway associated with a second monitoring pathway, making the first control and monitoring pathways redundant, the second monitoring pathway generating second residuals,
    wherein the system further comprising a shared diagnostic module inhibiting at least one of or the other of the first and second control pathways, once a fault is detected, based on the first and second residuals.

* * * * *